Nov. 12, 1957  G. H. HARRED  2,812,939
MEANS FOR FEEDING BLANKS FROM A SUPPLY STACK
Filed May 14, 1953  7 Sheets-Sheet 1

Inventor:
George H. Harred
By
Attorney.

Nov. 12, 1957  G. H. HARRED  2,812,939
MEANS FOR FEEDING BLANKS FROM A SUPPLY STACK
Filed May 14, 1953  7 Sheets-Sheet 3

Inventor·
George H. Harred
By
Attorneys.

Nov. 12, 1957   G. H. HARRED   2,812,939
MEANS FOR FEEDING BLANKS FROM A SUPPLY STACK
Filed May 14, 1953   7 Sheets-Sheet 5

Inventor:
George H. Harred
By
Attorneys.

Nov. 12, 1957  G. H. HARRED  2,812,939
MEANS FOR FEEDING BLANKS FROM A SUPPLY STACK
Filed May 14, 1953  7 Sheets-Sheet 6

Inventor:
George H. Harred
By
Attorneys.

Nov. 12, 1957  G. H. HARRED  2,812,939
MEANS FOR FEEDING BLANKS FROM A SUPPLY STACK
Filed May 14, 1953  7 Sheets-Sheet 7

Inventor:
George H. Harred
By
Attorneys.

United States Patent Office 2,812,939
Patented Nov. 12, 1957

2,812,939

MEANS FOR FEEDING BLANKS FROM A SUPPLY STACK

George H. Harred, Westerly, R. I., assignor to Bostitch, Inc., Stonington, Conn., a corporation of Rhode Island Application May 14, 1953, Serial No. 355,120

5 Claims. (Cl. 271—44)

This invention relates to improvements in feeding means for box-blank folding machines and like apparatus wherein a supply of foldable blanks or other relatively thick sheets of paper, cardboard and the like are fed from a supply in the form of a stack contained in a bottomless hopper.

The present improvement relates more particularly to pre-feeding means for engaging the lowermost blank in the stack and feeding it forwardly to a short extent, whereafter the main feeding means engages therewith to advance the blank to one or more stations where various operations may be performed thereon.

One object of the invention is to provide improved means for pre-feeding a blank or sheet from the stack and so arranged and operated as to insure a positive engagement with the rearward edge of said blank without chance of the engaging means being misalined with the edge of the blank.

Another object of the invention is to provide pre-feeding means comprising a pivotally mounted feeding element having teeth for impaling the edge of the blank and so mounted as to adapt it to float for adjusting it in contact with the under side of the lowermost blank to bring its teeth into accurate relationship for engaging the edge of said blank.

Another object is to provide a self-adjusting, rockable pre-feed member which is adapted to be rocked by the lowermost blank resting thereupon to position its teeth in accurate alinement with the rearward edge of the blank for engagement therewith.

Another object is to provide a self-adjusting pre-feed element capable of accurately engaging the edge of the lowermost blank to be fed even though said blank may be warped or curved throughout portions of its width with its edge misalined at some point therealong.

Further objects and advantages of the present improvement are set forth in the following specification which describes a preferred form of construction of the feeding means as illustrated in the accompanying drawings. In the drawings.

While the present invention is herein disclosed as applied to use with the feeding mechanism of a box-blank folding machine, it is equally well adapted for other types of apparatus employed for feeding different varieties of sheet-material having definite thickness.

As herein shown and described the present improvements are applied to a blank-folding machine of the type disclosed in my prior application for patent Serial No. 256,539 filed November 15, 1951, now Patent No. 2,740,629, dated April 3, 1956. Therefore, the general organization of the blank-supplying and delivering means will be described herein only briefly in connection with the present pre-feeding means for use therewith.

Figure 2:
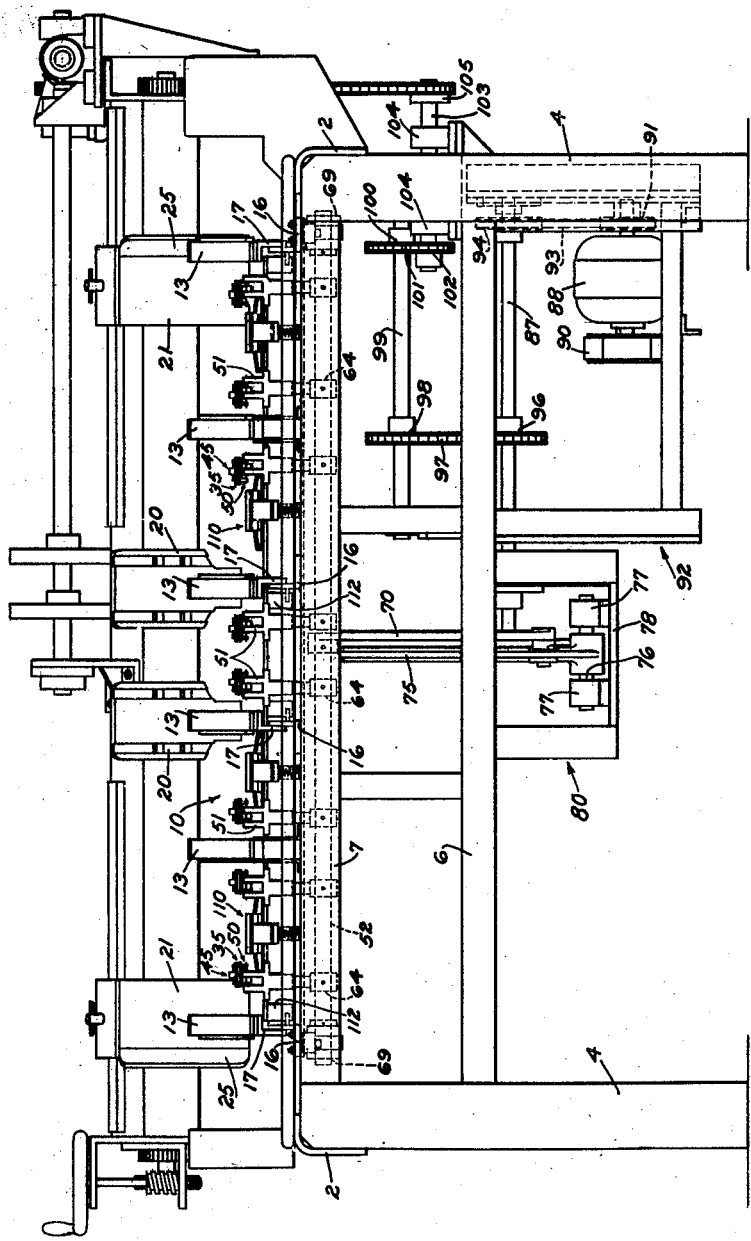
Fig. 2 is an end elevational view of the machine viewed from the feeding end and showing the plurality of pre-feed members and the main feed elements in their relationship.

The operating mechanism of the machine may be mounted on a horizontally-extending framework comprising side rails 2 and a bed or table 3 composed of spaced, parallel strips of considerable length, all supported from the floor by angle-iron legs 4 at its ends. A pair of horizontal rails 5 connect the legs 4 at each side of the framework and provide supports for mounting certain parts of the mechanism of the machine. Transverse angle-iron stringers 6 and 7 (Fig. 2) extend laterally between the end legs 4 to reinforce and brace the frame structure.

Mounted on the table 3 is a hopper 10 for containing a supply of blanks B stacked therein, the end walls 11 and 12 of the hopper being inclined toward the rear at substantially the same angle and the wall 12 adapted for adjustment toward and away from the wall 11 to take blanks or sheets of different lengths. The rear wall 11 of the hopper 10 may be composed of a plurality of laterally-spaced sheet-metal strips 13 (Fig. 5) with their feet 15 mounted on the table strips 3 which are supported from longitudinally-extending angle-irons 16 by means of uprights 17 at their ends. The adjustable front wall 12 of the hopper may also be formed by spaced apart sections 20 and 21 as described in my prior application referred to above. The sections 21 are in the form of plates laterally adjustable toward and away from each other by suitable means in accordance with the width of the blanks to be stacked in the hopper, the plates having marginal flanges 25 for engaging the side edges of the blanks B to locate them laterally in the hopper.

The stack of blanks B in the hopper 10 is normally supported by perches 30 inserted under the forward end of the stack and adapted to be intermittently withdrawn therefrom for periodically delivering the lowermost blank from the stack. As the perches 30 are withdrawn, gripping means in the form of needles 32 are slid forwardly to impale the forward ends of the blanks for supporting them in the hopper while a previously delivered blank is being fed forwardly therebeyond. Preferably, a pair of perches 30 are arranged in spaced apart relationship laterally of the machine to render them capable of sustaining the stack of blanks B throughout a substantial portion of their width. The mechanism for alternately withdrawing the two perches 30 and simultaneously advancing the needles 32 to impale them in the ends of the blanks B is fully set forth in my prior application and will not be further described herein.

Figure 3:
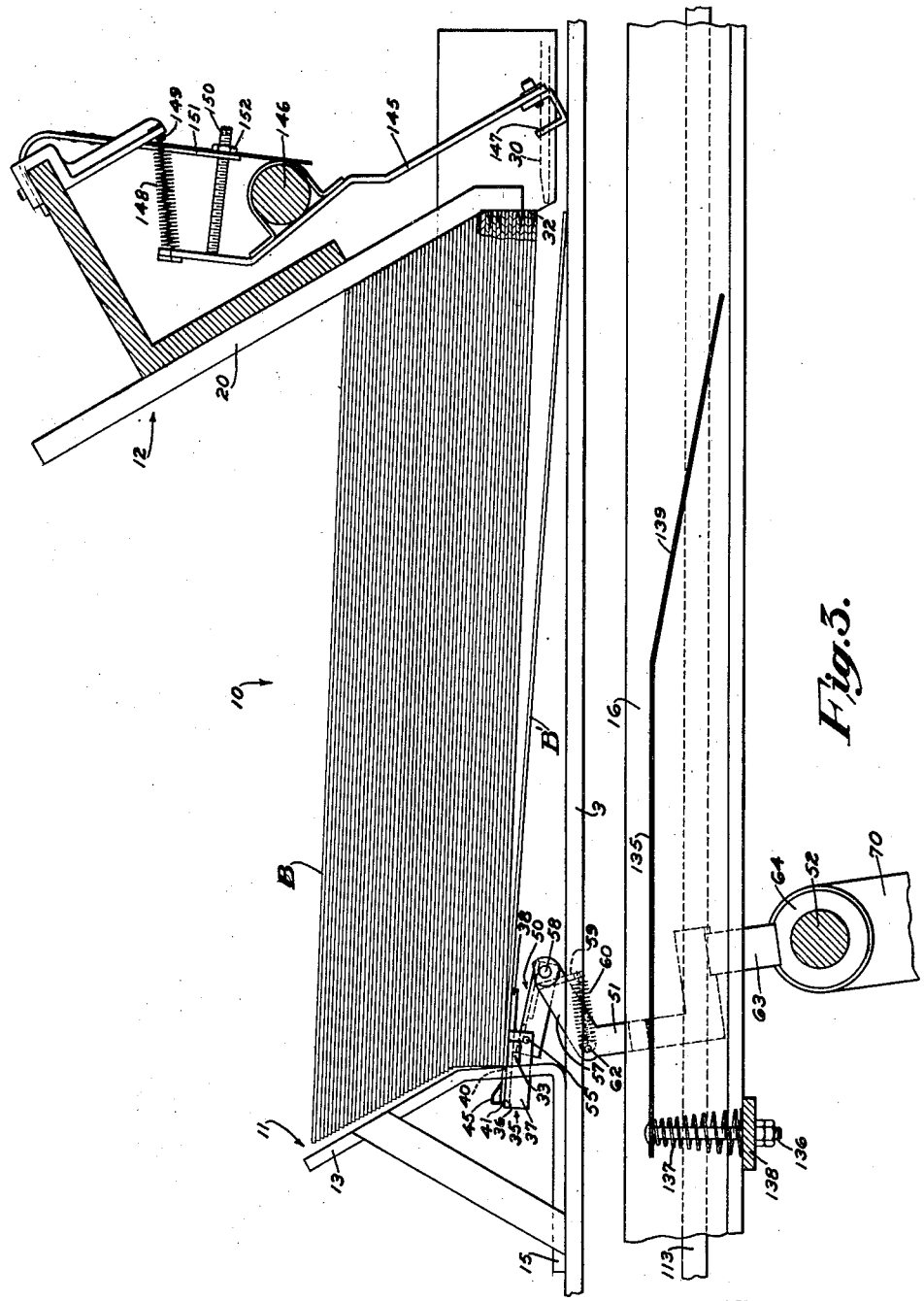
Fig. 3 is an enlarged view of the feeding end of the machine showing the hopper for containing a supply of box-blanks and illustrating the pre-feed means as engaging with the lowermost blank delivered from the hopper to initiate its forward feed.
Figure 5:
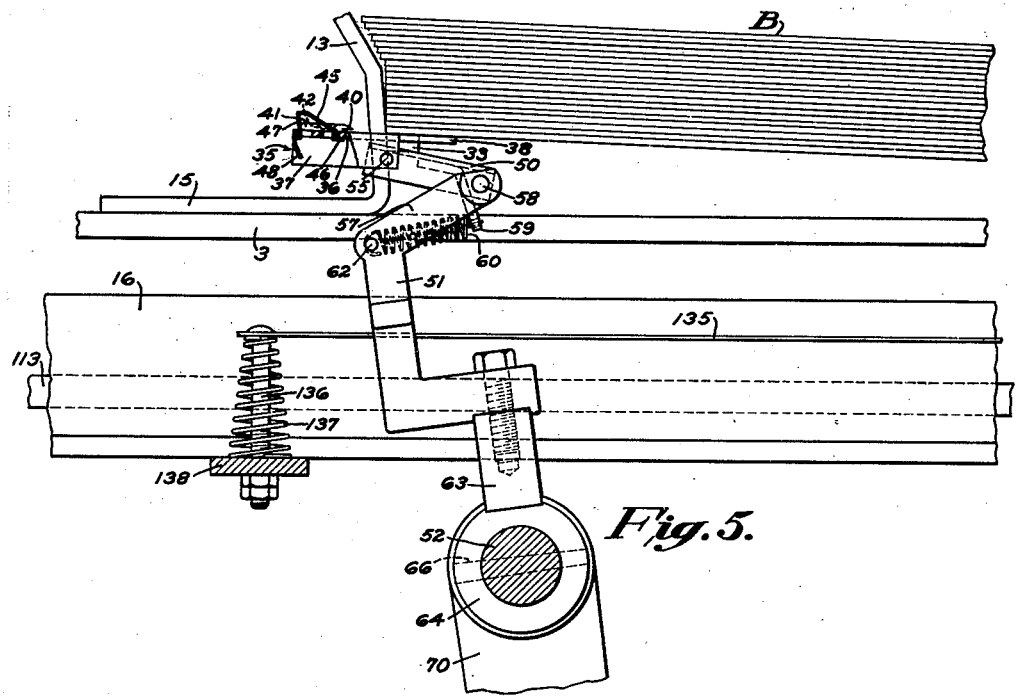
Fig. 5 is an enlarged view showing the pre-feed means in position under the stack before being advanced for engaging the lowermost blank to separate it from the stack and feed it forwardly.
Figure 7:
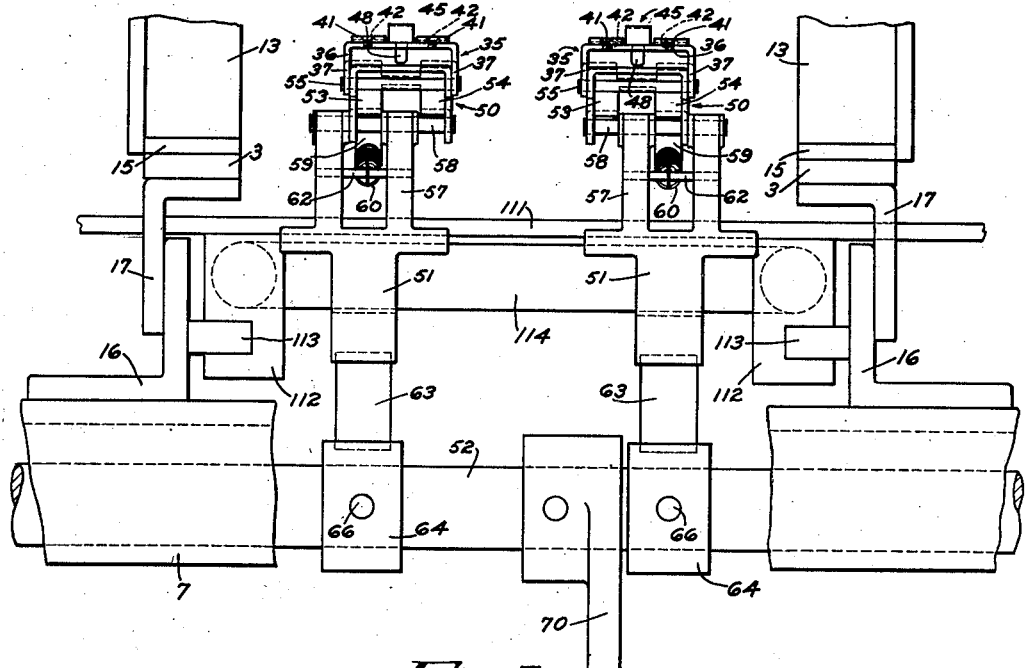
Fig. 7 is an enlarged detailed view at the rear of the pre-feeding means illustrating two of the devices connected to their operating shaft.
Figure 8:
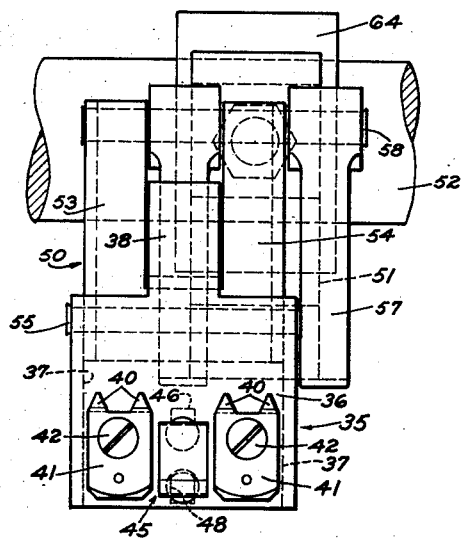
Fig. 8 is an enlarged plan view of one of the pre-feed elements showing its pivotal mounting and illustrating the toothed elements for impaling the end of the blank to be fed.
Figure 9:
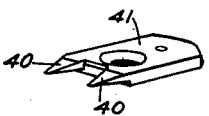
Fig. 9 is a perspective view of one of the toothed elements of the pre-feeding member.
Figure 10:
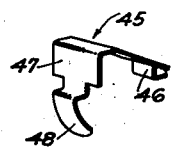
Fig. 10 is a perspective view of the sheet-metal rest which is attached to the pre-feed element and operative for engaging under the lowermost blank in the stack to sustain it above the feeding blank engaged with the pre-feed element.

Prior to the feeding operation the rearward end of the stack of blanks B is supported on projecting shelves 33 on the several wall sections or strips 13, shown most clearly in Fig. 3 of the drawings. A plurality of the pre-feed means are employed at his end of the hopper, eight being shown in Fig. 2 as arranged in spaced relationship across the width of the table 3. As all of these devices are of the same construction, only one will be described in detail. Referring to Figs. 5, 7 and 8 the pre-feed means comprises a pivoted rest or member 35, preferably formed of sheet-metal with a top plate 36 and downwardly-extending side flanges 37. Projecting forwardly from the plate 36 is a rectangular extension or tongue 38 disposed in the plane of the plate and adapted to act as a sort of feeler for contacting the under side of the lowermost blank B in the stack to adjust the member 35 for accurately alining its eeth 40 with the rearward edge of the blank B for engagement herewith. The teeth 40 are formed in pairs at the end of relatively small plates 41 fastened to the top of the member 35 by means of screws 42 having their screw-threaded shanks engaging in threaded holes in the top plate 36 (Figs. 7 and 8). The teeth 40 are of V-shape and beveled at top and bottom to sharpen their points. An abutment member 45 consisting of a sheet-metal strip bent to form an inclined portion at the front with a lip 46 hooked through a hole in the top plate 36, and a rearward vertical supporting portion 47 having its edge resting on the top plate with a spring catch or finger 48 snapped through another hole in the plate. The abutment member 45 acts to separate the feeding blank B' from the remaining blanks B thereabove as it slides in under the stack and forces the plate-member 35 to swing downwardly in the manner as more particularly explained hereinafter.

Figure 6:
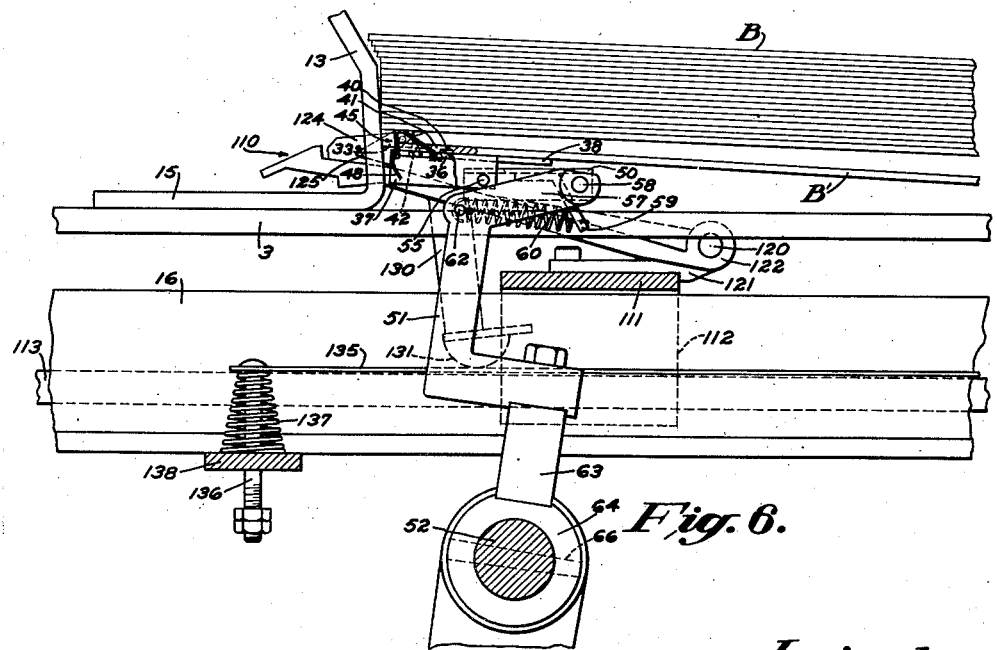
Fig. 6 is a similar enlarged view showing the pre-feed means engaged with a blank delivered from the stack and illustrating the means for supporting the remaining blanks in the stack thereabove with the lowermost blanks separated therefrom.

The plate-member 35 is rockably mounted on a second rockable member 50 which, in turn, is pivoted to an L-shaped arm 51 that is adapted to be oscillated by a rock-shaft 52 (Figs. 5 and 6). The member 50 is of U-shape or bifurcated with a pair of spaced arms 53 and 54 having side flanges projecting downwardly therefrom. A cross-pin 55 extends through holes in the side flanges 37 of the plate-member 35 and corresponding holes in the vertical flanges of the bifurcated member 50 to pivotally mount the plate-member thereon. The opposite end of the bifurcated member 50 is pivotally mounted on an angular extension 57 of the L-shaped arm 51 by means of a cross-pin 58 passing through holes in its sides and the sides of the extension 57. Reaching downwardly from one of the arms of the member 50 is an inclined finger 59 having its upper angular portion welded or otherwise secured thereto and provided at its end with a hole for connection with the end of a helical spring 60. The opposite end of the spring 60 is anchored to a pin 62 in the L-shaped arm 51. The spring 60 is thus adapted to rock the member 50 upwardly to cause it to maintain the plate-member 35 with its tongue 38 bearing against the bottom of the lowermost blank B in the stack to locate the teeth 40 in precise alinement with the rearward edge of this blank.

Figure 1:
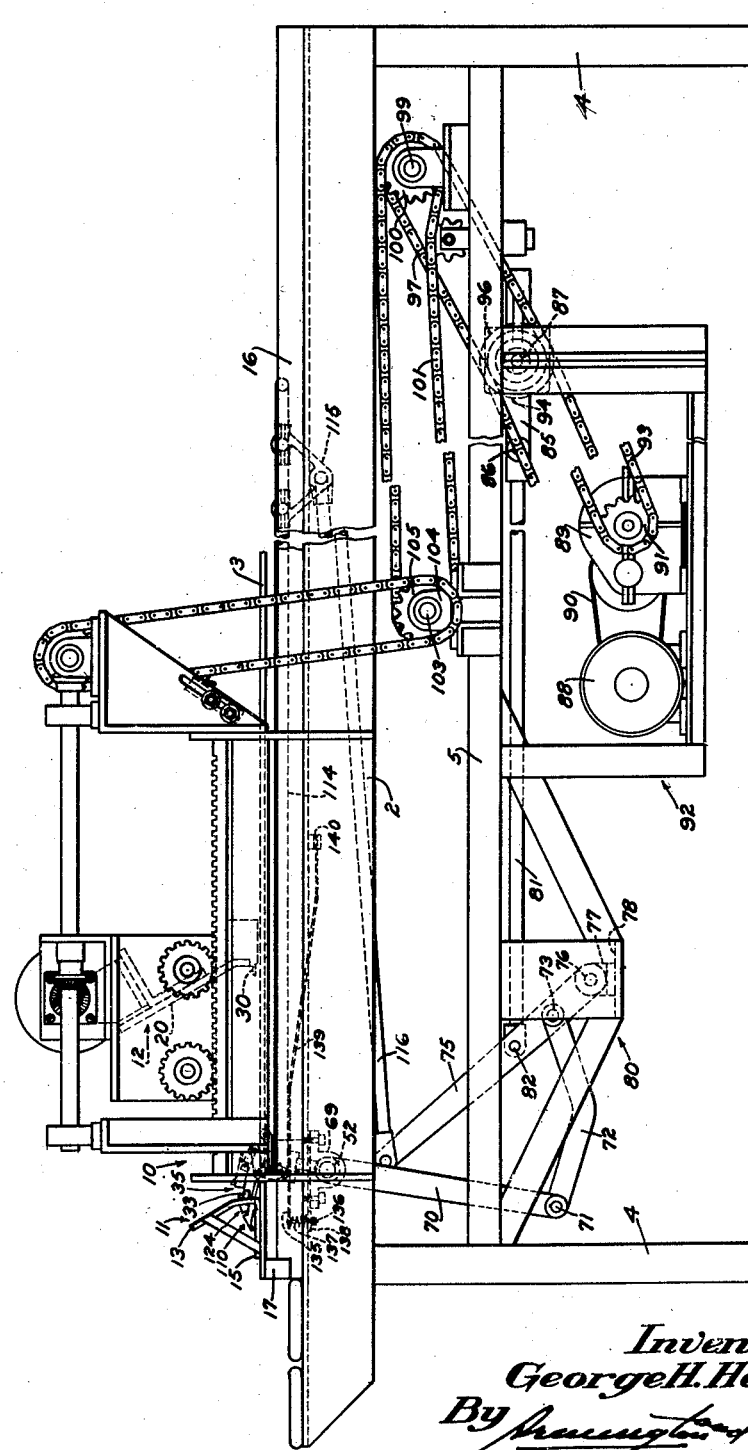
Fig. 1 is a side elevational view of a box-blank feeding machine showing it broken away at the center to reduce the length of the view.

The L-shaped arm 51 is bolted to a block 63 welded or otherwise fastened to a collar 64 keyed to the transverse shaft 52 by a tapered pin 66. The shaft 52 is rockably mounted at its opposite ends in pillow-block bearings 69 (Fig. 2) fastened by bolts to the horizontal plates 16 overlying the angle-iron stringer 7 previously referred to. The shaft 52 is oscillated from an arm or lever 70 (Figs. 1, 2 and 4) at the center of the machine. The lower end of the arm 70 is pivotally connected at 71 to an angular link 72 having its opposite end pivotally joined at 73 to a lever 75. The lever 75 is pivotally mounted on a shaft 76 held in a pair of bearings 77 (Fig. 2) which are supported on the cross-piece 78 of a U-shaped frame 80 depending from the angle-iron stringers 6 at the center of the machine.

The lever 75 is rocked by means of a connecting rod 81 having its end pivotally connected thereto at 82 with its opposite end pivoted to a crank-arm 85 at 86. The crank-arm 85 is rotated by a crank-shaft 87 (Fig. 1) driven from an electric motor 88 through the means of a chain and sprockets described in detail in my prior application hereinbefore referred to. These driving connections are described briefly herein as comprising a variable-speed unit 89 driven from the motor 88 by a belt 90 to rotate a sprocket 91. The motor 88 and variable-speed unit 89 are supported on a frame 92 suspended from the angle-iron stringers 5 extending longitudinally of the framework of the machine between the legs 4. The sprocket 91 is connected by a chain 93 to a sprocket 94 on the crank-shaft 87. The crank-shaft 87 carries a sprocket 96 (Fig. 2) with a chain 97 engaging a sprocket 98 on a cross-shaft 99 above the crank-shaft 87. A sprocket 100 on the shaft 99 is connected by a chain 101 to a sprocket 102 on a short shaft 103 journaled in bearings 104. The shaft 103 carries a sprocket 105 with a chain extending upwardly therefrom to driving means employed for operating certain parts of the machine; namely, the cams which reciprocate the perches 30 for withdrawing them from under the forward end of the stack to release a blank therefrom and for advancing the needles 32 to impale them in the ends of the blanks; and then alternately inserting the perches under the stack after a blank has been delivered therefrom and withdrawing the needles to allow the stack to be lowered against the perches. These connections are fully described in my prior application referred to above and since they form no part of the present invention they will not be further described herein.

Figure 11:
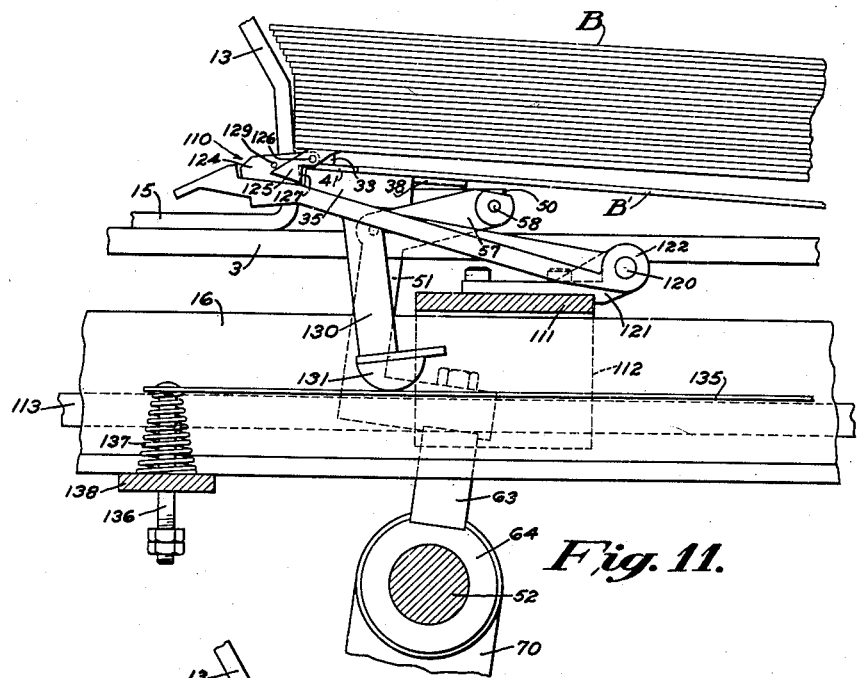
Fig. 11 is an enlarged detailed view of the main blank-feeding means or pusher before it engages with the rearward edge of the blank which has been initially advanced by the pre-feeding means.
Figure 12:
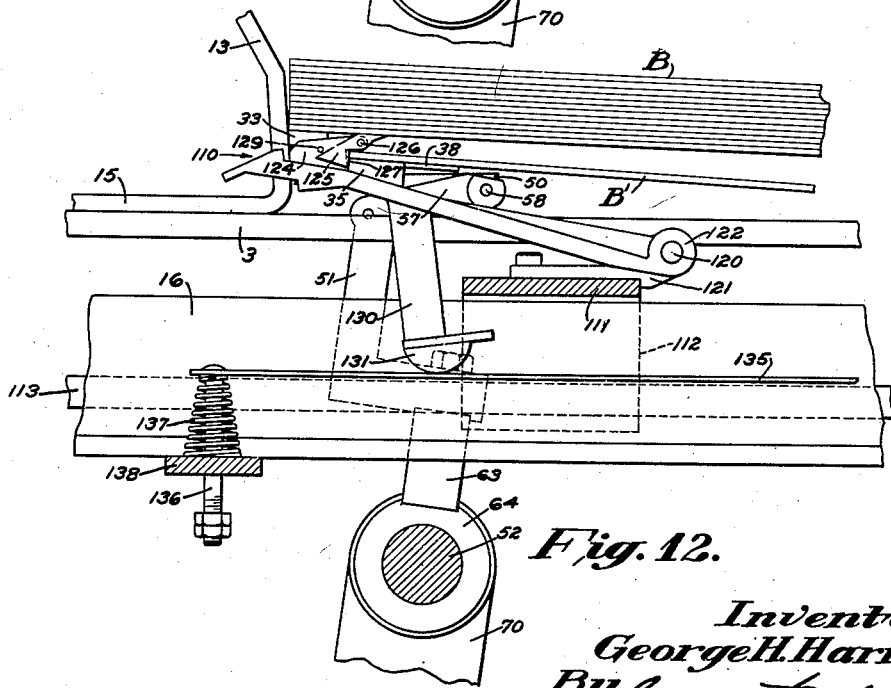
Fig. 12 is a similar view showing the main blank-feeding means or pusher after it has engaged the blank advanced by the pre-feeding means for feeding said blank forwardly beyond the hopper.

As described in my prior application, pusher-means are provided for feeding the delivered blank along the table 3 after it has been advanced to a slight extent by the pre-feed mechanism. The pushers 110, shown in detail in Figs. 11 and 12, are constructed and arranged in substantially the same manner as described in my prior application. A plurality of the pushers 110 are mounted on a cross-beam 111 (Fig. 11) supported on end blocks 112 that slide on rails 113 extending longitudinally of the framework of the machine. The beam 111 is connected to a rectangular, skeleton frame 114, shown by dotted lines in Fig. 1, which is formed of tubing and carries a V-shaped bracket 115 at its forward end, this construction being similar to that described in my prior application referred to above, and more particularly in United States Letters Patent No. 2,574,527 to W. E. Bowersock dated November 13, 1951 for Box-Blank Folding Machines. Suffice it to state herein that the frame 114, sometimes called the shuttle, is slid along the bed or table 3 by means of a connecting rod 116 pivoted to the bracket 115 and pivotally connected at its opposite end to the lever 75, previously mentioned, which is actuated from the crank-arm 85. It will be observed by reference to Fig. 1 that the relatively short throw of the crank-arm 85 which is connected by the rod 81 to the lever 75 at a relatively short distance from its pivot will slide the frame 114 with a relatively long stroke since the frame is connected to the outer end of said lever 75 so as to multiply the motion of the crank-arm 85. On the other hand, the movement of the arm 70 by the lever 75 is of much shorter extent since the arm is connected by the link 72 to the lever 75 at a point only a short distance from the axis of the lever.

Referring to Figs. 11 and 12, the pushers 110 are pivotally mounted on pins 120 in brackets 121 bolted to the top of the beam 111, the pins 120 being inserted through bosses 122 on the brackets. Each pusher 110 extends rearwardly from its pivot in a relatively long arm carrying an abutment 124 adjacent its free end. A pawl-like latch 125 is pivoted to the side of the abutment 124 by means of a pin 126, the shorter arm of the pawl being beveled or flattened to adapt it to contact the under side of the lowermost blank B remaining in the stack after delivery of a blank B' therefrom. The longer arm of the latch 125 is formed with a shoulder 127 adapted to engage with the rearward edge of the delivered blank B' as shown in Fig. 12. A pin 129 projects from the side of the abutment 124 to limit the pivotal movement of the latch 125 for holding it in position to properly engage with the under side of the stack of blanks B.

Extending downwardly from the pusher 110 is an inclined arm 130 formed at its lower end with a semi-spherical, button-like protuberance 131 that is adapted to ride on a plate 135 to sustain the pusher in its uppermost position for engaging the pawl 125 with the bottom blank B. The plate 135 is resiliently supported at the rearward end of the machine by a vertical pin or bolt 136 enclosed by a helical spring 137 resting on a strip 138 fastened to the under side of the rail 16. At its opposite end the plate 135 (Fig. 3) is inclined downwardly in a portion 139 to form a sort of ramp along which the rounded end 131 of the arm 130 is caused to ride to gradually lift the pusher 110 into operative relationship as shown in Fig. 11. The inclined end 139 of the plate 135 is fastened at 140 to the under side of the rail 16. It will be understood that this construction is repeated across the width of the machine with a ramp-plate 135 for each of the four pushers 110. When the beam 111 is retracted rearwardly to return the pushers 110 into position for engagement with a new blank B', after the previously delivered blank has been carried forwardly beyond the hopper 10, the spherical end 131 of the arm 130 will ride up the ramp 139 onto the horizontal portion of the plate 135 to bring the latch 125 against the bottom of the stack of blanks B, the method of operation of this part of the feeding means being explained more fully in connection with the operation of the complete apparatus.

As illustrated in Fig. 3, a plurality of sheet-metal dogs 145 are pivoted on a cross-rod 146 and provided with U-shaped shoes 147 fastened to their lower ends. A spring 148 anchored at 149 has its opposite end fastened to the shorter upper arm of the dog 145, thus tending to rock the latter to engage the angular end of the shoe 147 with the top of a blank as it is slid along the table 3 so as to prevent its retrogressive movement during the feeding operation. A stop-screw 150 mounted in a downwardly extending plate 151 is adapted to be adjusted for engagement with the inclined upper end of the dog 145 and locked in place by a nut 152 to locate its shoe 147 in proper relation to the table 3 for frictionally engaging the blank being fed.

Figure 4:
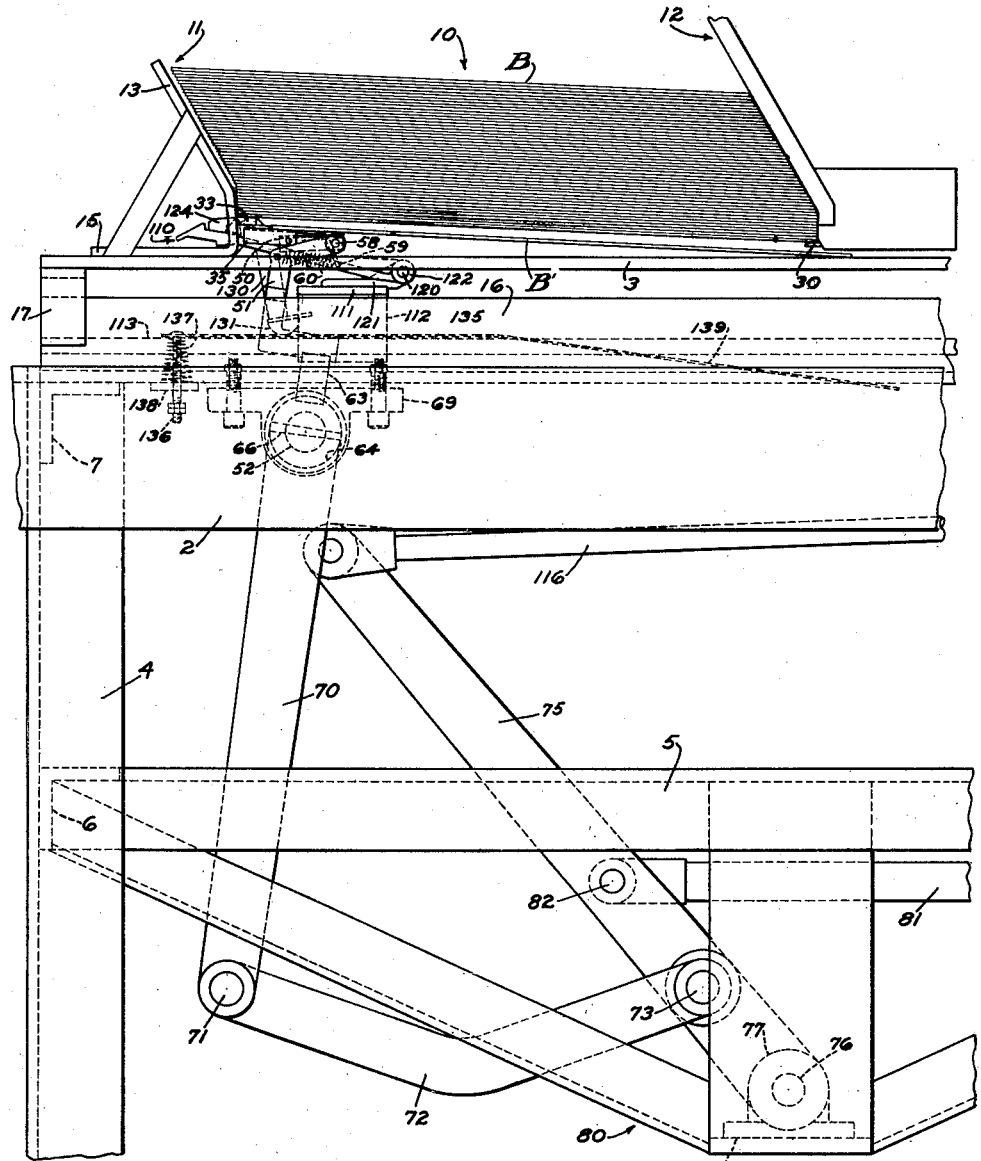
Fig. 4 is a side elevational view of the operating means for the pre-feed mechanism shown in combination with the main feed device or pusher.

To prepare the machine for operation a supply of blanks B is placed in the hopper 10 after the forward wall sections 12 have been properly adjusted to correspond to the length and width of the blanks. The blanks B are placed in the hopper 10 with their rearward edges sliding down the wall sections 13 to cause their forward edges to engage with the inclined wall sections 12 and stack them in staggered relationship as shown in Fig. 4. The stack of blanks B will thus be held in the hopper 10 with its rearward end resting on the shelves 33 and its forward end supported on the perches 30. The pre-feeding mechanism will then be in the relationship illustrated in Fig. 5 with the tongues 38 of the plate-members 35 engaging under the lowermost blank B in the stack so that when the perches 30 are withdrawn, as shown in Fig. 3, the bottom blank B' will be released at its forward end to cause this end to drop down onto the table 3; it being noted that the pivotal mounting of the members 35 adapt them to float to adjust themselves to the inclination of the blank B'. In the meantime the needles 32 will have been slid toward the end of the stack to engage in the forward edges of the lower blanks remaining in the hopper 10 above the blank B' which has been partially released therefrom.

To start the operation of the machine the current is switched on to energize the electric motor 88 (Figs. 1 and 2) whereby power is transmitted therefrom through the variable-speed unit 89 to drive the sprocket 94 and thereby the crank-shaft 87. Power will also be transmitted through the chains and sprockets previously described to drive the shafts 99 and 103 which operate the perch and needle mechanisms shown and described more particularly in my prior application referred to hereinbefore. As the crank-shaft 87 is rotated from the power means the crank 85 will draw the connecting rod 81 to the right as viewed in Fig. 1 to rock the lever 75 clockwise. Clockwise motion of the lever 75 will act through the link 72 to rock the arm 70 in counter-clockwise direction whereof to oscillate the rocker-shaft 52 in the same direction and carry the pre-feed means toward the left to the position shown in Fig. 5; that is, with the plate-members 35 partially withdrawn from under the end of the stack, but having their tongues 38 still remaining inserted thereunder. Meanwhile, the clockwise motion of the lever 75 will move the link 116 toward the right, as viewed in Fig. 1, to propel the frame 114 in the same direction; it being understood that the pre-feed members 35 and the pushers 110 are moved in opposite directions with the beam 111 making a long stroke while the stroke of the members 35 is relatively short due to the connection of the link 72 near the axis of the lever 75. In other words, since the link 116 is connected to the outer end of the lever 75 a long stroke is imparted to the frame 114 and beam 111 carrying the pushers 110, while the arm 70 being connected by the link 72 to the lever 75 at a point closely adjacent its pivot 76, only a relatively short motion is given to the rock-shaft 52 which oscillates the pre-feed members 35.

As the crank-arm 85 continues its rotation and crosses its dead-center on the opposite side of the shaft 87 it starts to act through the connecting rod 81 to rock the lever 75 in the opposite direction or counterclockwise to draw the frame 114 rearwardly. During this rearward motion of the frame 114 and beam 111, that is, towards the left as viewed in Fig. 1, the arm 130 rides up the ramp 139 (Fig. 3) and continues along the horizontal portion of the plate 135 as shown in Fig. 11 to lift the pushers 110 and carry their latches 125 into position for engaging the blank B' which meanwhile has been fed forwardly by the pre-feeding members 35, these members having been advanced to the position shown in Fig. 4 at this juncture. That is to say, as the frame 114 and beam 111 are returned towards the rearward end of their stroke by the counter-clockwise rocking of the lever 75 the link 72 will rock the arm 70 and oscillate the shaft 52 clockwise to thereby swing the pre-feed members 35 forwardly. This forward motion of the members 35 causes their teeth 40 to impale the edge of the blank B' and slide the latter forwardly into the position shown in Fig. 6. The abutments 45 are thus caused to ride in under the stack of blanks B to force the members 35 downwardly by depressing their mountings 50 whereby to separate the blank B' from the other blanks B in the stack. At this juncture the crank-arm 85 is returned to first position (Fig. 1) and as it continues to rotate and crosses dead-center again it will start to rock the lever 75 toward the right as viewed in this latter figure. The frame 114 is thus caused to be slid forwardly to engage the latches 125 on the pushers 110 with the edge of the blank B' and, continuing its movement, this blank will be slid forward on the table 3 to feed it beyond the magazine 10 to a station where it is operated upon, for example, to fold over the flaps of the blank.

Meanwhile, the rocking motion of the arm 70 and shaft 52 is reversed to cause the arm 51 to carry the pre-feed members 35 rearwardly into the position shown in Fig. 5 before its motion is again reversed to feed the next blank B' forwardly. The end of the stack of blanks B is then supported on the shelves 33 in the hopper 10 while the delivered blank B' is fed forwardly. In this manner the machine operates on each blank B released at its forward end by the withdrawal of the perches 30 to impart a relatively short extent of feed thereto; thereby releasing its rearward end from the fixed shelves 33 on the wall members 13 of the hopper 10, whereafter the blank is in position to be engaged by the pushers 110 to continue its forward travel to the maximum extent as required to advance each blank beyond the hopper or into position to be further processed.

It will be observed from the foregoing specification that the present invention provides a particularly efficient feeding mechanism to insure that each blank or sheet delivered from the supply has its edge accurately engaged by the toothed pre-feed members without chance of mis-alinement therewith due to curling or warping of the sheets at their edges. The pre-feed elements 35 being pivotally mounted on the pivoted members 50 adapts them to tilt with a floating action as their tongues 38 are first engaged with the under side of the blank B' to be fed so that they are always brought into position with the teeth alined with the edge of the blank. The pre-feeding means also acts to advance each blank into proper relationship for engagement by the pushers 110 which eventually impart an extended advance or feeding motion to the blank for carrying it beyond the hopper. The pre-feeding means being connected for operation by the means which actuate the general feeding means or pushers results in considerable simplification of the mechanism by employing a single power-operated driving means so that the invention may thus be applied to machines already in use without material change in their construction or method of functioning.

While the improvements are herein described and illustrated as embodied in a preferred form of construction, it is to be understood that variations may be made in the structure and arrangement of the elements without departing from the spirit or scope of the invention as defined in the accompanying claims. Therefore, without limiting myself in this respect, I claim:

1. In a blank-feeding mechanism having pusher means for successively feeding blanks from a supply stack, the combination therewith of pre-feeding means comprising a pivoted member, means for reciprocating said pivoted member, a tiltable element pivotally supported on said pivoted member and having teeth at its rearward end for engaging the edge of the lowermost blank in the stack, said tiltable element provided with a forwardly-projecting portion for engaging the under side of said blank to adjust said element with its teeth accurately alined with the edge of said blank, means on said tiltable element projecting upwardly above its teeth for engagement with the under side of the stack as the lowermost blank is fed forwardly relatively thereto whereby to force said tiltable element downward bodily to carry the blank downward therewith for separating it from the remaining blanks in the stack.

2. In a blank-feeding mechanism having means for supporting a stack of blanks at the rearward end thereof, means for releasably supporting said blanks at their forward ends, and means for actuating said last-named means to release the forward end of the lowermost blank in the stack; the combination of pre-feeding means comprising a pivoted mounting member, means for reciprocating said mounting member, a tiltable feeding element pivoted to said mounting, teeth at the rearward end of said tiltable element for engaging the rearward edge of the lowermost blank in the stack to feed it forwardly, said tiltable element having a portion projecting forwardly of its pivot for engaging against the under side of the lowermost blank in the stack to adjust said element with its teeth in accurate alinement with the edge of said blank, said tiltable element being bodily movable downward by the pivoting movement of said mounting member to carry the feeding blank downwardly for releasing it from the blank thereabove and separating it from the remaining blanks in the stack.

3. In a feeding mechanism, a rock-shaft, an arm connected for oscillation by said rock-shaft, a mounting pivoted to said arm, a feed-member pivoted intermediate its ends on said mounting to adapt it to tilt when its forward end makes contact with the under side of a blank, teeth on said tiltable member disposed rearwardly of its pivot and adapted to be brought into alinement with the edge of said blank for engagement therewith, means for oscillating the rock-shaft to move the arm for engaging the tiltable member with the blank and feeding the latter forwardly, and an abutment on said tiltable member, said abutment projecting for a considerable distance above the teeth on said tiltable member with its forward end inclined downwardly toward the top of said tiltable member to adapt it to slide under the stack of blanks to separate the lowermost blank from the remaining blanks in the stack as it is fed forwardly therefrom.

4. In a machine for feeding blanks from a supply stack, a plurality of spaced shelves for supporting the rearward end of the stack, means for releasably supporting the forward end of the stack, means for actuating said forward supporting means to release the end of the bottom blank from the stack, a plurality of pre-feeding means at the rearward end of said stack located in the spaces between the shelves, each pre-feeding means comprising a rockable member, a tiltable element pivotally connected to said rockable member and having a forwardly-projecting extension adapted to engage against the under side of the lowermost blank in the stack, said tiltable member having teeth at its rearward end engageable with the edge of said lowermost blank, means for reciprocating said rockable member to cause the tiltable element to force the blank off the shelves, and an abutment on each tiltable element projecting upwardly therefrom considerably above its teeth for engagement with the under side of the stack, said abutment adapted to force the rockable member downwardly to cause the tilting element to separate the lowermost blank from the remaining blanks in the stack.

5. In a device of the type indicated comprising a hopper for containing a stack of blanks, a series of fixed shelves arranged at spaced intervals along the rearward wall of said hopper to adapt them to support one end of the stack, means at the forward end of the hopper for releasably supporting the blanks at this end, means for actuating said last-named means to release the forward end of a single blank from the under side of the stack, and pre-feeding means comprising rockable members reciprocable on the under side of the shelves, a tiltable element pivoted to each rockable member and having an extension projecting forwardly from its pivot for slidably engaging against the under side of the stack, said tiltable element having teeth at its rearward end carried into accurate alinement with the edge of the lowermost blank in the stack when its forward extension is slid thereunder, and means at the rearward end of said tiltable element projecting above the teeth thereon for engaging the under side of the stack to force said rockable member and said tiltable member downwardly to carry the feeding blank downward for separating it from the remaining blanks in the stack.

(References on following page)

References Cited in the file of this patent
UNITED STATES PATENTS

| | | |
|---|---|---|
| 1,169,925 | Clark | Feb. 1, 1916 |
| 1,434,608 | Graham | Nov. 7, 1922 |
| 1,643,646 | Swift | Sept. 27, 1927 |
| 1,644,695 | Sieg | Oct. 11, 1927 |
| 1,684,389 | Ford | Sept. 18, 1928 |
| 1,756,073 | Swift | Apr. 29, 1930 |
| 2,456,449 | Rouan | Dec. 14, 1948 |
| 2,534,893 | Williams | Dec. 19, 1950 |
| 2,540,162 | Bowersock | Feb. 6, 1951 |
| 2,677,543 | Ohrn | May 4, 1954 |